(12) United States Patent
Digernes et al.

(10) Patent No.: US 8,820,496 B2
(45) Date of Patent: Sep. 2, 2014

(54) DAMPER FOR DAMPING VIBRATIONS WITH A DAMPING BODY PROMOTING FORMATION OF FOAM

(75) Inventors: Anders Digernes, Trondheim (NO); Arne Martin Nordmark, Trondheim (NO); Roger Olsen, Flatasen (NO)

(73) Assignee: Teeness ASA, Trondheim (NO)

( * ) Notice: Subject to any disclaimer, the term of this patent is extended or adjusted under 35 U.S.C. 154(b) by 349 days.

(21) Appl. No.: 12/528,778

(22) PCT Filed: Sep. 5, 2007

(86) PCT No.: PCT/NO2007/000312
§ 371 (c)(1),
(2), (4) Date: Aug. 26, 2009

(87) PCT Pub. No.: WO2008/105664
PCT Pub. Date: Sep. 4, 2008

(65) Prior Publication Data
US 2010/0096228 A1    Apr. 22, 2010

(30) Foreign Application Priority Data

Feb. 27, 2007    (NO) .................................. 20071104

(51) Int. Cl.
*F16F 7/10* (2006.01)
*B23C 5/00* (2006.01)
*F16F 15/173* (2006.01)
*B23B 27/00* (2006.01)

(52) U.S. Cl.
CPC ............... *F16F 15/173* (2013.01); *B23C 5/003* (2013.01); *B23B 27/002* (2013.01)
USPC ............ 188/378; 267/137; 408/143; 409/141

(58) Field of Classification Search
USPC ............ 188/269, 378, 322.18; 267/137, 125; 408/143; 409/141, 234; 82/158, 159, 82/160, 904
See application file for complete search history.

(56) References Cited

U.S. PATENT DOCUMENTS 2,699,696 A * 1/1955 Hahn ............................ 408/143
3,642,378 A    2/1972 Hahn et al.
3,833,248 A * 9/1974 Wossner et al. ............... 293/134

(Continued)

FOREIGN PATENT DOCUMENTS

DE    3024636    1/1982
DE    4006744    9/1991

(Continued)

OTHER PUBLICATIONS

International Search Report for International Application No. PCT/NO2007/000312 dated Apr. 16, 2008.

(Continued)

*Primary Examiner* — Thomas J Williams
*Assistant Examiner* — Mariano Sy
(74) *Attorney, Agent, or Firm* — Patterson & Sheridan, LLP

(57) ABSTRACT

A damper includes at least one substantially longitudinal damping body with two end surfaces and one substantially longitudinal surface between. The damping body is placed in a substantially longitudinal cavity, which includes a cavity surface, with a damping fluid that includes a liquid and a gas. At least one of the cavity surface, end surfaces or longitudinal surface is broken, and the damping body can pulsate in the cavity when the damper is in operation.

4 Claims, 3 Drawing Sheets

(56) References Cited

U.S. PATENT DOCUMENTS

| | | | |
|---|---|---|---|
| 3,838,936 A | 10/1974 | Andreassen et al. | |
| 3,861,494 A * | 1/1975 | Grego | 181/207 |
| 3,923,414 A | 12/1975 | Hopkins | |
| 4,061,438 A * | 12/1977 | New | 408/143 |
| 4,164,825 A * | 8/1979 | Hutchison | 42/1.06 |
| 4,543,019 A * | 9/1985 | Shikata | 408/57 |
| 4,616,738 A * | 10/1986 | Shurtliff | 188/380 |
| 4,821,850 A * | 4/1989 | Geiling et al. | 188/315 |
| 4,982,719 A * | 1/1991 | Haggard et al. | 124/89 |
| 5,018,606 A * | 5/1991 | Carlson | 188/267.1 |
| 5,343,649 A * | 9/1994 | Petrovich | 42/1.06 |
| 5,385,136 A * | 1/1995 | Thomas | 124/89 |
| 5,700,116 A * | 12/1997 | Cobb, Jr. | 409/141 |
| 5,810,528 A * | 9/1998 | O'Connor et al. | 409/141 |
| 5,816,373 A * | 10/1998 | Osterberg et al. | 188/380 |
| 5,927,448 A * | 7/1999 | Yamazaki | 188/281 |
| 6,443,673 B1 * | 9/2002 | Etling et al. | 408/1 R |
| 7,234,379 B2 * | 6/2007 | Claesson et al. | 82/1.11 |
| 7,591,209 B2 * | 9/2009 | Murakami et al. | 82/158 |
| 2006/0111255 A1 * | 5/2006 | Shirahama et al. | 508/469 |
| 2006/0118372 A1 * | 6/2006 | Hammer et al. | 188/284 |
| 2006/0275090 A1 | 12/2006 | Onozuka et al. | |
| 2010/0242696 A1 * | 9/2010 | Digernes et al. | 83/169 |
| 2011/0318130 A1 * | 12/2011 | Freyermuth et al. | 409/135 |

FOREIGN PATENT DOCUMENTS

| | | |
|---|---|---|
| EP | 1693131 | 8/2006 |
| GB | 337466 A | 11/1930 |
| GB | 1578343 A | 11/1980 |
| JP | 2005058752 A | 3/2005 |
| JP | 2005058752 A * | 3/2005 |
| SU | 1196153 A * | 12/1985 |
| WO | WO 2004/024389 | 3/2004 |

OTHER PUBLICATIONS

Norwegian Search Report for Patent Application No. 20071104 dated Oct. 8, 2007.

Official Action from Israel Patent Office dated May 7, 2012; Israel Patent Application No. 200142. (English Translation).

* cited by examiner

DAMPER FOR DAMPING VIBRATIONS WITH A DAMPING BODY PROMOTING FORMATION OF FOAM

The present invention concerns a damper for damping vibrations with a damping body in a damping fluid, wherein the damping body or a cavity where the damping body is placed, promotes formation of foam.

The damper is particularly, but not exclusively intended for milling tools and similar tool holders that are used in machine tools. Typical examples are end mills that are used during chip cutting machining (turning, milling, etc.). The apparatus can also be used on "clampings" and other parts of the machine, in addition to work pieces. The self generated oscillations typically occur as a result of the dynamic stiffness of the structure being to low.

Various types of damping apparatuses are well known, and a related apparatus is shown in Norwegian patent Nr 128 725. This patent concerns a damping body that necessarily must be placed in a bore in the boring bar, because the bore constitutes an essential part of the damping apparatus, meaning that the damping effect is a result of interaction between the damping body and the bore itself, through resilient elements provided between the elements.

In NO 0 120 609 it is shown an apparatus for damping oscillations. The apparatus includes a damping body placed in a bore. Spring washers are placed at each side of the damping body. Conical clamping washers are provided to control the spring constant of the spring washers. The spring washers are compressed during damping with the apparatus.

The development moves in a direction towards continuously increasing relationship between length/diameter (overhang) on the tool holders. The dynamic stiffness of the tool holder will then be reduced, and this again imposes requirements to the damping apparatus that must be adapted to this situation. The problem with the here to known art is that to be able to adapt the damping apparatus to this new condition, the frequency of the system must be reduced. This will require either resilient elements with a lower spring constant, or a grater mass in the damping body.

Other patents that should be mentioned are U.S. Pat. No. 4,061,438 and U.S. Pat. No. 2,699,696, both describing some kind of mass in a cavity surrounded by a liquid with damping properties.

None of the patents mention the importance of foaming (mixing of air into the oil) to achieve a good damping function even with small forces and to avoid that the damping body sticks due to suction in the adjoining cavity. Neither are those designs that are included to promote the foaming described. The present invention is a considerable improvement in this respect.

The present invention concerns a damper for damping vibrations, with at least one substantially longitudinal damping body with two end faces and a substantially longitudinal face between these. Longitudinal in this connection does not necessarily relate to a specific rate of slenderness, but is defined to describe a longitudinal direction or a geometry. Thereby the damping body may of course be "short" without this having any effect on the scope of the protection of the claims. The same concerns for the cavity for placing the damping body, that only needs to be adapted to the damping body. The damping body has a longitudinal direction and a transversal direction and is placed in a substantially longitudinal cavity with a damping fluid. The cavity defines at least one cavity surface and the damping body defines at least one damper body surface. The damping fluid includes a portion of liquid and a portion of gas and at least one of the cavity surfaces or the damping body surface is broken to effect the foam formation in the damper fluid when in use. That these surfaces are broken, is meant to describe that the surfaces may be discontinuous, may include holes, recesses, splines, expressed roughness or in any other way departs from surfaces that are smooth and without holes. The important feature is however that the design of the damping body in combination with the cavity the damping body is placed in, is shaped such that it promotes a mixing of gas and liquid such that it is formed bubbles or foam in the liquid.

The damping body may be of any suitable material, and is often made of a material with high specific gravity.

The end face of the damping body may be broken by at least one axial hole. The size of the hole or the holes may vary as required for accommodating a damping fluid, the required mass of the damping body, the bandwidth the damper shall be used, the required balance of the body etc.

The substantially longitudinal surface of the damping body may be broken by at least one transversal hole.

The substantially longitudinal surface of the damping body may be broken by at least one radial hole and the end face of the damping body may be broken by at least one axial hole.

At least one of the holes may extend all the way thorough.

The outer surface of the damping body and/or the surface of the cavity may be broken by at least one axial groove.

The outer surface of the damping body and/or the surface of the cavity may be broken by at least one transversal groove.

The outer surface of the damping body and/or the surface of the cavity may be broken by at least one transversal groove and at least one axial groove.

The outer surface of the damping body and/or the surface of the cavity may be broken by at least one diagonal groove.

The outer surface of the damping body and/or the surface of the cavity may be broken by crossing diagonal grooves.

The outer surface of the damping body and/or the surface of the cavity may be broken by at least one recess.

The outer surface of the damping body and/or the surface of the cavity may be broken by a screw threaded surface.

The outer surface of the damping body and/or the surface of the cavity may be broken by a coarse, discontinuous surface structure.

The damping body may be substantially cylindrical and the substantially longitudinal cavity may be cylindrical.

The damping body may have any combination of the above mentioned geometries.

The damping fluid may include between 30% and 90% liquid, preferably about 75% liquid and the rest gas in the cavity.

The damping fluid may include air and oil, but other mediums may well be used. The liquid may include foam promoting substances and may have a predeterment desired viscosity. Other gases than air may well also be used.

A particular feature with this invention in relation to other similar systems/inventions is that it is focused on the relationship between the damping liquid and gas, and how one by means of the design of the components (in particular the damping body) may create propagation of gas/air-pockets (bubbles) in the damping fluid that is formed by the liquid and gas. Such a propagation of the air pockets will provide elasticity to the film of damping fluid that is placed between the damping body and the adjoining cavity. This elasticity is created in the damping fluid film in that the compressibility of the damping fluid film goes from being almost incompressible, until tear off of gas/air pockets in the damping liquid supplies or imposes compressibility for the damping fluid that is formed by the mixture of gas/damping liquid as the gas is compressible.

An axial hole going thorough the damping body in a system with a mixture of gas and damping fluid, will give as a result that the gas will be drawn into this hole when the damping liquid is pulled towards the surface of the adjoining cavity (the cartridge wall) and the rotation (due to the centrifugal forces). When the forces from the machining process affects the tool such that the damping body tends to be drawn out of position (and give a damping effect) then air/gas can be torn in from both ends of the damping body (both ends of the longitudinal body) and thereby ease the formation of air pockets in the damping liquid, and the elasticity this will provide to the "damping film".

During operation with a proper effect, it will be a good spread of the damping liquid with gas pockets around the entire damping body in the area between the damping body and the adjoining cavity. The damping body will pulsate in this cavity affected by the forces that are imposed by the tool, and constantly operate to prevent further vibrations from being created.

It is a goal to have an oil with high viscosity and good damping effect, at the same time as the mass in the damping body should as great as possible. To combine this is not simple, and the advantage of the invention is that these requirements can be combined such that it is achieved an improved performance by shaping the damping body and adjust the amount of oil and air.

Increasing viscosity of the oil improves the damping effect, but may at the same time lead to suction and sticking of the damping body to the adjoining cavity, and the result may be that it not will be torn loose and contribute to the damping of the tool or that it is required disproportionate strong forces to tear loose the damping body and to create tool damping. The invention improves this situation by promoting mixture of gas bubbles in the oil/damping fluid. In this way good function is maintained even with small forces on the tool and problems due to sticking of the damping body to the adjoining cavity are prevented.

The invention focuses on the importance of mixing gas into the damping fluid, and this has not been the object in other similar systems in other inventions. The amount of oil and high viscosity is important to achieve the best possible damping in the system. At the same time the mixture with air is critical. In the invention, may a hole at the centre of the damping body act as a reservoir of oil before the system is put into rotation (that is, before the tool is used). This reservoir will under operation (when the tool is used) automatically be emptied and fluid will distribute itself in the cavity between the damping body and the adjoining cavity due to the centrifugal forces that pulls/flings the oil outwards. When this happens, the cavity at the centre of the damping body will be filled with gas (air) instead of oil, and this gas will in this way easily be accessible from both ends of the damping body, and will more quickly be able to contribute to the expansion of the gas pockets in the damping fluid and this is important for the function. The reservoir ensures that it is a sufficient amount of damping fluid available to cover the greatest possible part of the surfaces and to give the best possible damping function during operation, and at the same time it will not be at the expense of the amount of gas which is important to ensure the formation of bubbles. The design of this reservoir as an axial hole in the damping body eases at the same time the tear inn of gas in the damping fluid because the gas can be torn in from both sides of the longitudinal damping body.

SHORT DESCRIPTION OF THE FIGURES

DETAILED DESCRIPTION OF THE ENCLOSED DRAWINGS

Figure 1:
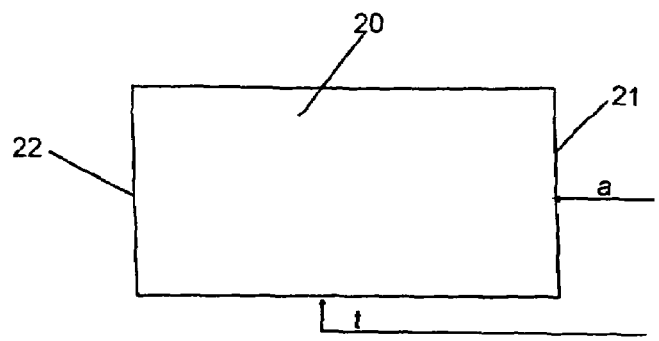
FIG. 1 shows a damping body according to the invention where longitudinal and transversal directions of the damping body are indicated.

FIG. 1 shows a damping body where the axial or longitudinal direction of the damping body and the transversal or radial direction of the damping body are shown. FIG. 1 is included to ease the further description of the damping body in accordance with invention.

The damping body is intended used in a damping system that includes a damping body in a cavity, filled with a proportion of damping fluid that typically includes three quarters of liquid for instance oil, and a quarter gas for instance air. The gravity force will distribute the damping liquid and the gas because the damping liquid is more heavy than the gas. In use will such systems frequently be exposed to rotation/motion in that the tool typically rotates with from 1000 rpm and up towards 10 000 rpm and in some cases, the tool is rotated well beyond these limits. This imposes forces on the damping body, the liquid and the gas. The damping body will move towards one side, and the damping liquid will be pulled towards the wall in the adjoining cavity and will distribute itself along the wall. The gas is lighter than the liquid and will be placed outside the liquid. In the case on FIG. 2 where the damping body includes a central axial bore, the liquid will be withdrawn from the bore or the hole when the tool is rotated, and the hole will be filled by the gas as a result. Then when the tool is exposed to forces during machining, these forces may lead to a build up of vibrations unless these forces are attenuated. The damping or attenuation is preformed in that the damping body is drawn out of position due to the forces and thereafter pulsates around in the cavity. The damping liquid will along with the mass provide an inertia in this continuous alteration of position (the pulsing) and this will dampen the impact forces that are applied to the tool.

Figure 2:
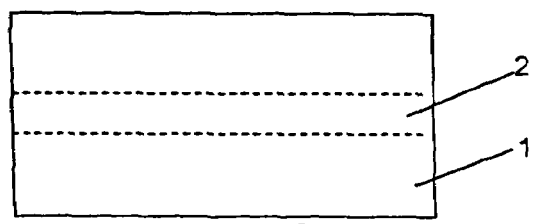
FIG. 2 shows a damping body with one or several longitudinal holes.

In the embodiment shown on FIG. 2, will the hole 2 at the centre of the damping body 1 act as a reservoir for the liquid before the system is put into rotation (before the tool is used). This reservoir will in operation, when the tool is rotated automatically, be emptied and will be distributed in the cavity between the damping body 1 and the adjacent cavity due to the centrifugal forces that pulls/slings the liquid outwards. When this occurs will the cavity at the centre of the damping body 1 be filled with gas instead of liquid (oil) and this gas is then available from both ends of the damping body and is more quickly able to contribute to the spread of gas pockets in the damping liquid. This is important for the operation. The reservoir, or the through-going boring 2 ensures that a sufficient amount of damping fluid is available to cover as much of the surface as possible to give a good damping function under operation, without being on the expense of the amount of gas that is necessary to achieve a sufficient formation of bubbles. The design of this reservoir as an axial hole 2 in the damping body 1 eases at the same time the tear off of gas in the damping fluid because the gas can be torn in from both sides of the longitudinal damping body 1.

The number of through-going holes 2 in the damping body 1 may be varied to provide the desired amount of liquid and gas in the system, and to tune the volume and weight of the damping body.

Two or more axial holes can also serve as a reservoir, and the placement of the holes can affect the sluggishness or inertia and the balance of the damping body. Furthermore will the number of holes affect the tearing and the desired formation of bubbles.

Figure 3:
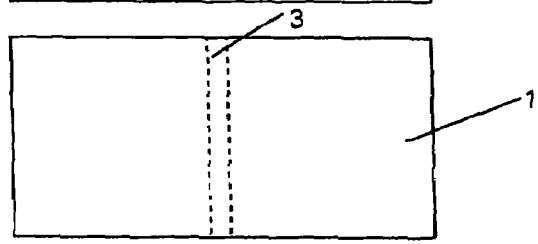
FIG. 3 shows a damping body with one or several through-going and transversal holes.

From FIG. 3 it is shown a damping body 1 with a through-going radial hole 3 that also can create additional oil volume and will affect the bubble or foam formation in the gas and the fluid that jointly forms the damping fluid.

Figure 4:
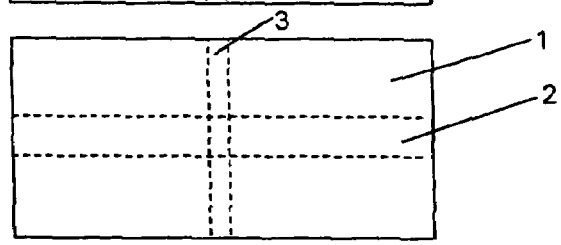
FIG. 4 shows a damping body with a combination of one or several through-going transversal holes and one or several through-going longitudinal holes.

FIG. 4 shows a combination of through-going radial holes 3 and axial holes 2. The positioning of the holes 2 and 3 will normally be such that the damping body 1 is balanced.

Figure 5:
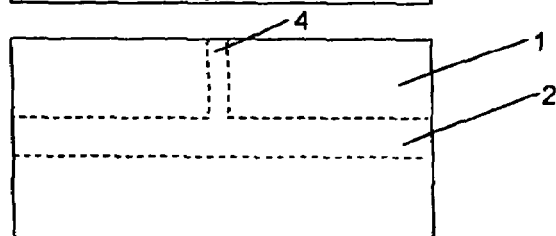
FIG. 5 shows a damping body with a combination of one or several through-going longitudinal holes and one or several transversal holes.

However the damping body may well be designed as shown on FIG. 5, with a combination of one or several through-going axial holes 2 and one or several radial holes 4. The radial holes 4 may typically meet the axial hole 2 such that the holes are internally connected.

Figure 6:
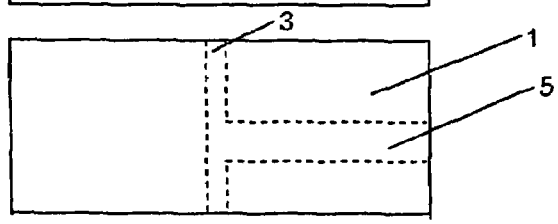
FIG. 6 shows a damping body with a combination of one or several through-going transversal holes and one or several longitudinal holes.

FIG. 6 shows a combination of a through-going radial hole 3 and an axial hole 5. Also in this embodiment, the holes are shown such that these meet and form channels inside the damping body 1.

Figure 7:
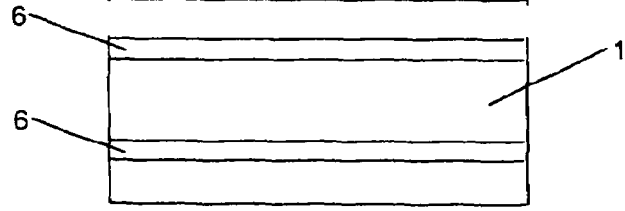
FIG. 7 shows a damping body according to the invention with one or several longitudinal grooves.
Figure 8:
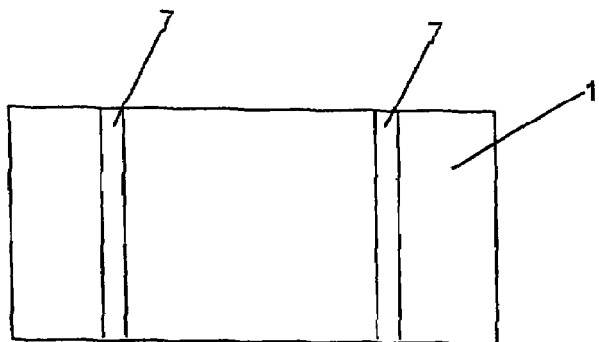
FIG. 8 shows a damping body according to the invention with one or several transversal grooves.

FIG. 7 shows yet a further embodiment of the damping body with axial grooves 6. The number of axial grooves 6 may however be varied as appropriate. The width, depth and design may be adapted such that the unit is given the desired properties.

Figure 9:
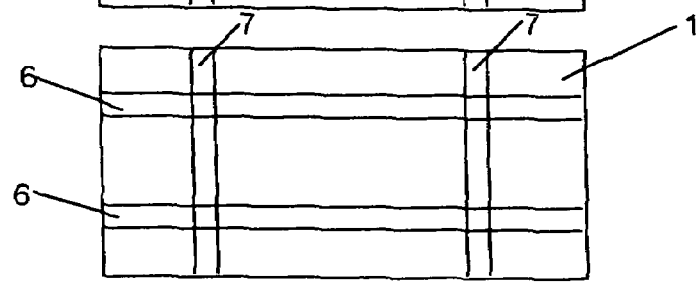
FIG. 9 shows a damping body according to the invention with a combination of one or several longitudinal grooves and one or several transversal grooves.

FIG. 9 shows a damping body 1 with a combination of radial grooves 7 and axial grooves 6.

Figure 10:
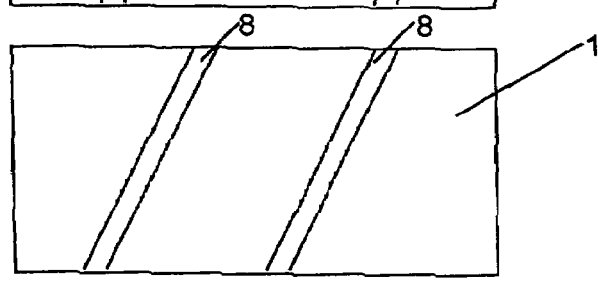
FIG. 10 shows an embodiment of a damping body according to the invention with one or several diagonal grooves.

FIG. 10 shows a damping body with diagonal grooves 8.

Figure 11:
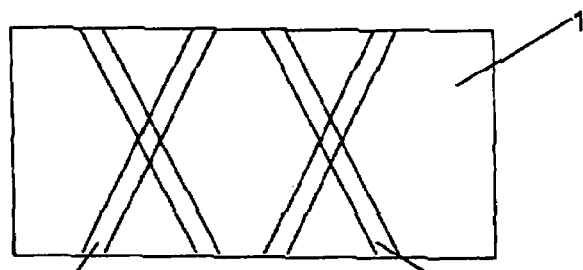
FIG. 11 shows a damping body according to the invention with a combination one or several crossing diagonal grooves.

FIG. 11 shows a damping body 1 with a combination of one or several crossing diagonal grooves 8.

Figure 12:
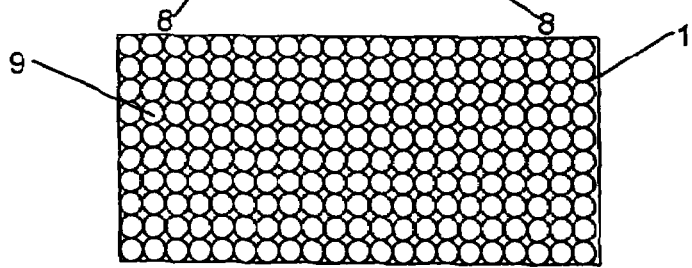
FIG. 12 shows a damping body according to the invention with one or several recesses in the surfaces.

FIG. 12 shows a damping body 1 with one or several recesses 9 in the surface. The recesses 9 in the surface may typically be small depressions that may be spherical or cylindrical and that may be placed in a pattern. The size of the depressions or the recesses 9 may be varied in accordance with a desired volume, and can be adapted to the properties of the damping fluid. The depressions may also be favourable to prevent that the body is "sucked to and sticks" to the cavity wall.

Figure 13:
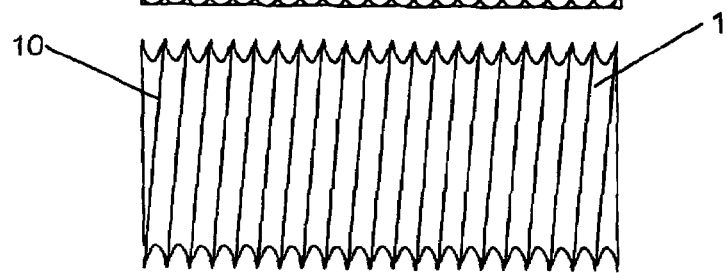
FIG. 13 shows a damping body according to the invention with a threaded surface.

FIG. 13 shows a damping body 1 with a threaded surface. The size and the depth of the threads can be varied according to the size of the damping body 1, the viscosity of the damping fluid, the requested bandwidth the damping body is to be used in, or other considerations that should be taken.

Figure 14:
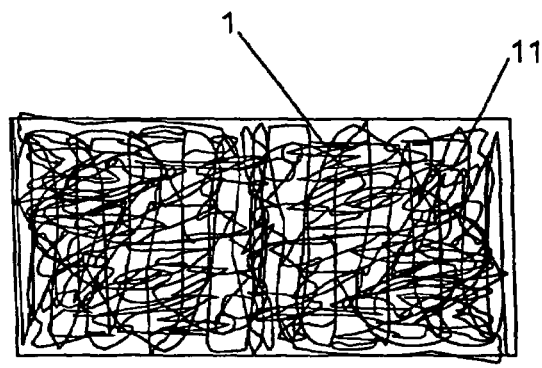
FIG. 14 shows a damping body according to the invention with a coarse surface structure.

FIG. 14 shows a damping body 1 with a coarse surface structure that also can affect the requested foam or bubble formation.

Figure 15:
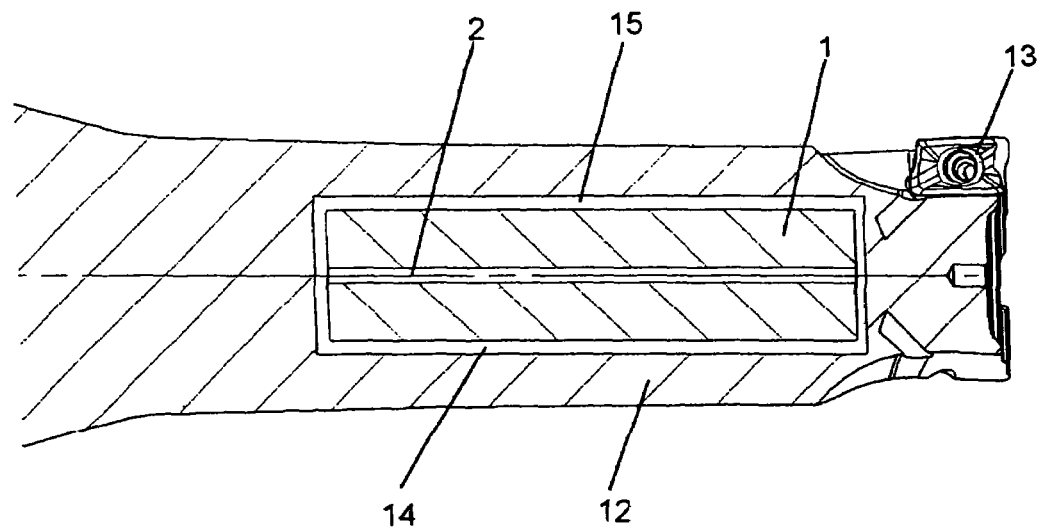
FIG. 15 shows a boring bar with a damping body.

FIG. 15 shows a boring bar 12 with a damping body 1 in according to the invention, with an axial through-going boring 2 placed in a cavity 15 with a surface 14. The boring bar 12 is illustrated with a bit 13 typical for boring bars.

The shown embodiments are sited to illustrate various variants of holes and surfaces that may be used to effect the required foam or bubble formation, or to prevent sticking of the damping body on to the cavity as previously mentioned. The geometries may also as mentioned influence the fluid volume, the distribution of fluid and the tear in of bubbles.

The various variants may of course also be combined such as for instance a damping body 1 as shown on FIG. 12 with depressions 9 in the surface, may be combined with one or several axial through-going holes 2 as shown on FIG. 2.

Furthermore the internal surface 14 in the boring bar 12 as shown on FIG. 15 may be designed with grooves or surfaces as for instance shown on the FIGS. 7-14.

Likewise more damping bodies may be placed in the same cavity 15 in the tool bar 12 if this is considered appropriate.

If so desired the damping body may also be tubular and a body fixed to the boring bar may be led through a hole in the body, to increase the surface the damping fluid acts on.

Such a through-going body may of course also be provided with a hole to increase the volume and thereby the allowable volume of boring fluids.

The damping body 1 is typically substantially cylindrical, and the cavity 15 in the boring bar 12 is typically also cylindrical.

However bodies with other shapes that promote formation of foam may also be used.

For instance may a damping body include an oval cross section.

The invention claimed is:

1. A method of damping vibrations in a machine tool, comprising:
    placing a substantially longitudinal and cylindrical damping body in a cavity of the machine tool, the damping body having an axial hole that extends through the entire longitudinal length of the damping body, the cavity being filled with a damping fluid comprising liquid and gas;
    rotating the machine tool such that the position of the damping body within the cavity is continuously altered;
    mixing the liquid and gas using the continuously altered damping body to form foam in the cavity; and
    damping vibrations in the machine tool using the damping body and foam.

2. The method of claim 1, further comprising forcing liquid out of the axial hole while forcing gas into the axial hole as the damping body pulsates within the cavity.

3. The method of claim 2, further comprising forcing gas into the axial hole from opposite ends of the damping body to ease the formation of gas pockets in the liquid.

4. The method of claim 3, wherein the gas comprises air and the liquid comprises oil.

* * * * *

UNITED STATES PATENT AND TRADEMARK OFFICE
CERTIFICATE OF CORRECTION

PATENT NO. : 8,820,496 B2  
APPLICATION NO. : 12/528778  
DATED : September 2, 2014  
INVENTOR(S) : Digernes et al.

It is certified that error appears in the above-identified patent and that said Letters Patent is hereby corrected as shown below:

CLAIMS:

Column 6, Claim 3, Line 61, please delete "2" and insert --1-- therefor;

Column 6, Claim 4, Line 64, please delete "3" and insert --1-- therefor.

Signed and Sealed this  
Third Day of February, 2015

Michelle K. Lee  
*Deputy Director of the United States Patent and Trademark Office*